Sept. 20, 1971  C. ORT  3,605,599
CAMERA HAVING LENS APERTURE SETTING DEVICE
Filed March 21, 1969
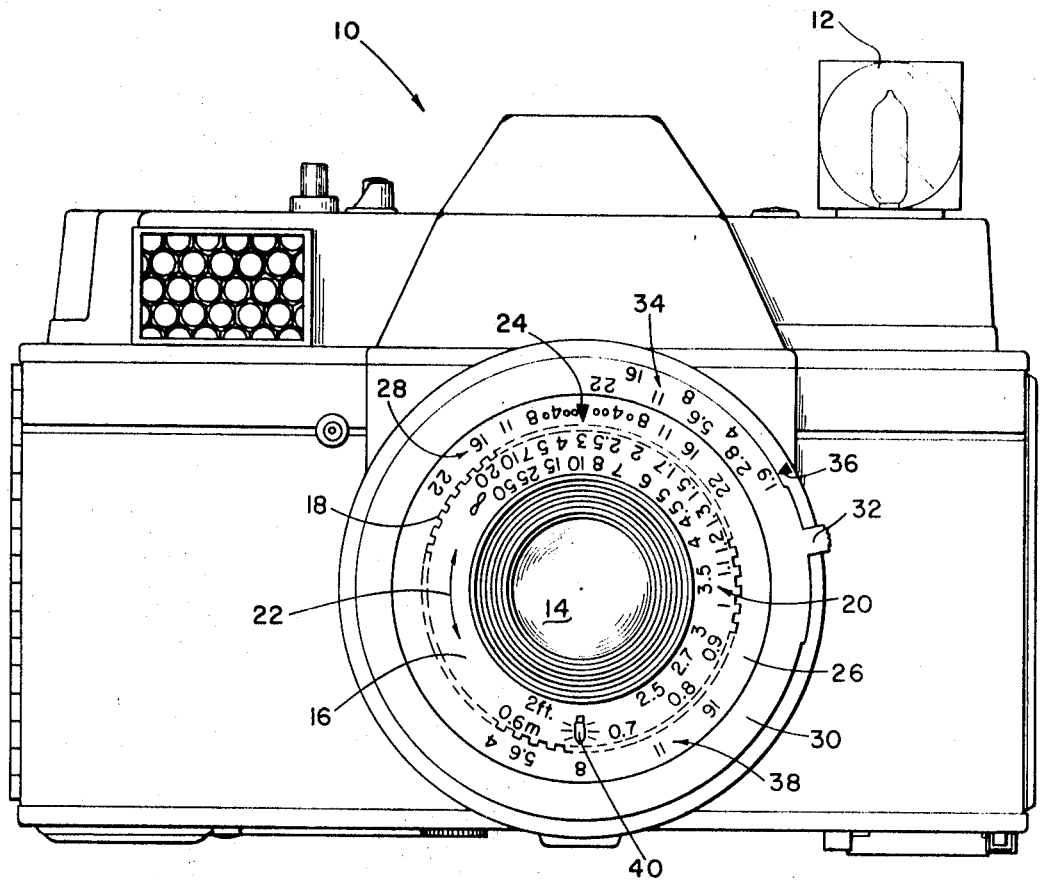
CARL ORT
*INVENTOR.*
BY *Milton S. Sales*
*Robert W. Hampton*
ATTORNEYS

3,605,599
CAMERA HAVING LENS APERTURE SETTING DEVICE
Carl Ort, Martin-Luther Str. 6, Stuttgart-Bad Cannstatt, Germany
Filed Mar. 21, 1969, Ser. No. 809,218
Claims priority, application Germany, July 31, 1969, K 61,913
Int. Cl. G03b 9/02
U.S. Cl. 95—64                              1 Claim

ABSTRACT OF THE DISCLOSURE

A camera adapted for flash photography having a diaphragm aperture setting ring with an index mark and aperture value scale associated therewith and a focus setting member. A second scale similar to the aperture value scale and a second index mark are associated with the focus setting member in such a manner that the proper aperture value will be shown on the second scale opposite the second index mark when the focus setting member is moved to the proper position corresponding to the distance between the camera and the subject. The aperture setting ring may then be positioned so that the first index mark is opposite the corresponding indicia upon the first scale.

BACKGROUND OF THE INVENTION

Field of the invention

The present invention relates to cameras having means for taking flash pictures and adjustable focus and diaphragm aperture setting members, and more specifically to a device for indicating the correct diaphragm aperture value for a given setting of the focus setting member during flash photography.

Description of the prior art

As is well known, the proper focus and diaphragm aperture setting are of decisive importance in taking flash pictures. To save the camera operator the trouble of calculating these settings by using the equation: distance ×diaphragm aperture number=guide number, calculating and setting devices including auxiliary scales and index marks have been proposed and used for flash photography in a wide variety of arrangements and embodiments. Despite these auxiliary devices, incorrect settings resulting in unsatisfactory flash pictures are frequently made. One of the main causes for the incorrect settings is that operators unfamiliar with the technical side of photography sometimes do not know which of the various scales on the camera are to be used for setting the diaphragm aperture when taking flash pictures.

SUMMARY OF THE INVENTION

It is an object of the present invention to provide the focus setting member of a camera with a scale and index mark that indicate the proper diaphragm aperture value for a given focus setting.

It is another object of the present invention to provide the focus setting member of a camera with a flash symbol that is particularly conspicuous and clearly signifies its relation to flash photography and so arranged so that after the focus setting is effected, the correct diaphragm aperture setting is indicated immediately adjacent to the flash symbol. Thus, even if the setting is made by a photographic layman, there can be no doubt as to the correct aperture setting for a particular flash picture.

The invention, and its objects and advantages, will be more apparent in the detailed description of the preferred embodiment presented below.

BRIEF DESCRIPTION OF THE DRAWING

In the detailed description of the preferred embodiment of the invention presented below, reference is made to the accompanying drawing which is a front elevational view showing a camera incorporating the present invention.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

The drawing shows a camera 10 which is adapted to receive a flashcube 12. Other types of arrangements for flash photography such as a socket for receiving a flash attachment with removable lamps may be added or substituted. This and other arrangements are well known in the art and need not be further described. Camera 10 has a lens 14 carried in a rotatable focus setting member 16 which, when rotated, telescopes the lens in a known manner. Focus setting member 16 is provided with a knurled edge 18 which serves as a finger grip when focusing the camera.

The camera may be provided with any known mechanism for setting the focus such as a range finder or a ground-glass screen, not shown, or, as shown, a distance scale 20. By turning focus setting number 16 in the directions of double ended arrow 22, the number on scale 20 corresponding to the distance to the subject may be aligned with an index mark 24 on a stationary ring 26. Two distance scales are shown, one being in feet and the other in meters. Stationary ring 26 is also provided with a depth of field scale, the method of use of which is well known to those skilled in the art.

Camera 10 is provided with a diaphragm having an adjustable aperture of known construction operatively connected to a ring 30 which may be rotated by a knurled knob 32. A conventional lens opening scale 34 having a series of indicia corresponding to diaphragm aperture opening values is provided on ring 30 and cooperates with an index mark 36 on a stationary ring. Of course the parts may be reversed so that scale 34 is stationary and index mark 36 is on movable ring 30.

The structure described to this point is conventional and can be found on many cameras presently in use. As a feature of the present invention, I have provided a second, auxiliary lens opening scale 38 with indicia similar to that of scale 34. The second lens opening scale is on stationary ring 26 which concentrically surrounds focus setting member 16. Focus setting member 16 carries a symbol 40 which is in the form of a conspicuous flash symbol. In the embodiment shown, symbol 40 takes the form of a flash lamp, but any suitable mark such as a lightning bolt could be used instead. Symbol 40 moves relative to scale 38 as the camera is focused. To further increase the conspicuousness of the symbol, it is recommended to distinctly color the flash symbol and/or the auxiliary lens opening scale. As with scale 34 and mark 36, scale 38 can be placed on focus setting member 16 and symbol 40 on stationary ring 26.

To operate the camera for daylight photography, focus setting member 16 is rotated until the lens 14 is properly set for the distance to the subject. This can be accomplished by using either distance scale 20, a rangefinder or a groundglass screen as described hereinbefore. Next, the operator adjusts the diaphragm aperture by rotating ring 30 by knob 32 until the proper numeral on scale 34, which has been determined by guide number, is aligned with index mark 36. Of course, for daylight operation, flashcube 12 is normally removed from the camera.

For flash use, flashcube 12 is reinserted in its socket and the camera is focused by turning ring 16 in the manner described hereinbefore. Once the camera is focused, the operator need only refer to auxiliary lens opening scale 38 and symbol 40 to obtain the proper setting value for ring 30. For the focus setting shown, symbol 40 is opposite numeral 8 on auxiliary scale 38. The operator now needs only to turn ring 30 in a clockwise direction until index mark 36 is opposite numeral 8 on lens opening scale 34. After this operation, the camera has been properly set for focus and diaphragm aperture.

While the foregoing description is based on the assumption that only films of the same speed and flashbulbs of the same guide number are used, different film speeds and guide numbers may also be used in cameras of this type. For this purpose, flash symbol 40 and/or auxiliary lens opening scale 38 may be arranged to allow them to be preset in a known manner depending upon the different guide numbers and/or film speeds used.

The invention has been described in detail with particular reference to a preferred embodiment thereof, but it will be understood that variations and modifications can be effected within the spirit and scope of the invention.

I claim:
1. In a camera having
   (a) means for effecting flash illumination of a photographic scene;
   (b) an objective lens;
   (c) a ring concentrically located with respect to the lens;
   (d) a diaphragm having an adjustable aperture, and
   (e) means for setting the diaphragm aperture, said means including:
      (1) a diaphragm setting ring concentrically located with respect to the focus setting ring;
      (2) a first scale including a series of indicia corresponding to a series of diaphragm settings, and
      (3) an index mark associated with the first scale and movable relative thereto for indicating the particular setting of the diaphragm, one of said first scale and said index mark being located on the diaphragm setting ring;
   the improvement comprising:
   (f) a second scale including a series of indicia corresponding to a series of diaphragm settings; and
   (g) a symbol representative of flash photography associated with said second scale, one of said second scale and said symbol being located on the focus setting ring and rovable relative to the other, said second scale and said symbol cooperating to indicate the proper diaphragm setting which corresponds to the focus setting of the camera for flash photography.

References Cited
UNITED STATES PATENTS

| | | | |
|---|---|---|---|
| 2,334,075 | 11/1943 | Davenport | 95—64A |
| 2,989,908 | 6/1961 | Bolsey | 95—64A |
| 3,386,356 | 6/1968 | Rentschler | 95—64X |

FOREIGN PATENTS

| | | | |
|---|---|---|---|
| 1,014,063 | 5/1952 | France | 95—64 |
| 1,144,105 | 2/1963 | Germany | 95—64 |

SAMUEL S. MATTHEWS, Primary Examiner

J. H. PETERS, JR., Assistant Examiner